March 22, 1966  M. CASTELLO ETAL  3,241,879
SPRING SEAT STRUCTURE
Filed June 10, 1963  2 Sheets-Sheet 2
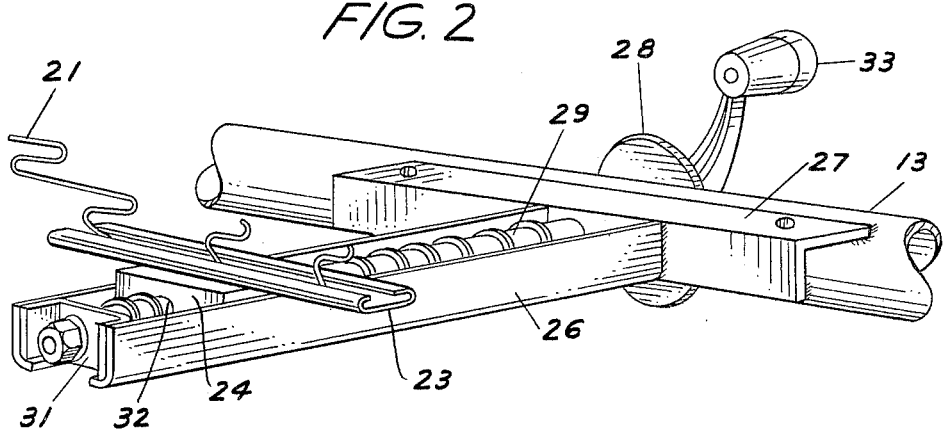
FIG. 2
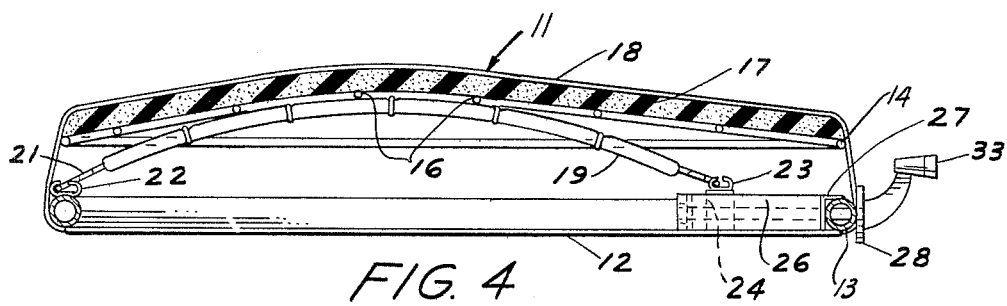
FIG. 4
FIG. 3
MICHAEL CASTELLO
JOSEPH V. MAKOWSKI
INVENTORS
BY John R. Faulkner
Jerry G. Beck
ATTORNEYS United States Patent Office 3,241,879
Patented Mar. 22, 1966

3,241,879
SPRING SEAT STRUCTURE
Michael Castello, Detroit, and Joseph V. Makowski, Farmington, Mich., assignors to Ford Motor Company, Dearborn, Mich., a corporation of Delaware
Filed June 10, 1963, Ser. No. 286,597
7 Claims. (Cl. 297—284)

This invention relates generally to a seat structure, especially for motor vehicles, and more particularly to a cushioned seat back rest structure employing sinuous or formed wire springs as the support elements and incorporating means for adjusting the supporting effect of the springs.

For increased riding comfort and for minimum occupant fatigue, a vehicle seat back rest must properly support the lumbar area of the seat occupant's back. But it is recognized that the construction of universally satisfactory permanent seat structures cannot be effected because of differences in individual body sizes and proportions.

In conventional front vehicle seat installations, provision is made for adjusting the height of the seat structure from the floor of the vehicle and the distance of the seat from the steering wheel and operating pedals. Also, optional accessories are available that permit the adjustment of the inclination of the back rest. None of these adjustments, however, directly control or vary the supporting effect of the back rest structure in relation to the spine of the individual person sitting in the seat.

Auxiliary back rests are commercially available which can be placed on the seat and retained thereon by fastening devices. Such auxiliary back rests usually fit only the individual need of the person who selected them, and very seldom find wide application in a vehicle which may be operated by a number of persons. These auxiliary back rests, as they are not integrally formed with the seat, do have some degree of adjustability as to their position on the seat itself. Since they are not, however, integral components of the vehicle seat structure, the necessary adaption between the design of the seat back of the vehicle seat and the individual selected back rests is frequently a not too satisfactory compromise.

Also, it is very desirable to be able to change the support pressure of the spring elements on the seat occupant during long rides to eliminate fatigue and muscle tension. This is not possible with auxiliary back rests.

It is an object of the present invention to provide a vehicle seat that assures effective support, especially of the lumbar area of a person's back, and which can be adjusted to suit individual requirements.

It is a further object to provide a vehicle seat which has a seat back that can be adjusted, if necessary, even while the vehicle is in motion.

It is a further object of this invention to provide a seat back rest having adjustable spring rates.

The seat structure embodying the present invention through which these objectives are obtained comprises an auxiliary frame which is maintained in a spaced relationship to a main frame. A plurality of parallel, spaced spring elements are provided that have their end portions attached to opposite sides of the auxiliary frame. The intermediate portions of these spring elements are deflectable from the plane of the auxiliary frame upon the application of a load thereto. An additional curved spring means is provided that extends in a substantial transverse relationship to the intermediate portions of the spring elements for engagement therewith upon the deflection of these spring elements. The end portions of the additional spring means are supported for relative movement in the plane of the main frame. An adjusting means is provided to move the end portions of the spring means towards or away from each other to vary the degree of curvature of the spring means. The degree of curvature of the spring means in turn is determinative of the resistance to deflection under load of the intermediate portions of the spring elements.

Other objects and advantages of the present invention will be made more apparent as this description proceeds, particularly when considered in connection with the accompanying drawings wherein:

FIGURE 2 is an enlarged perspective view of the spring adjusting mechanism embodying the present invention;

Figure 1:
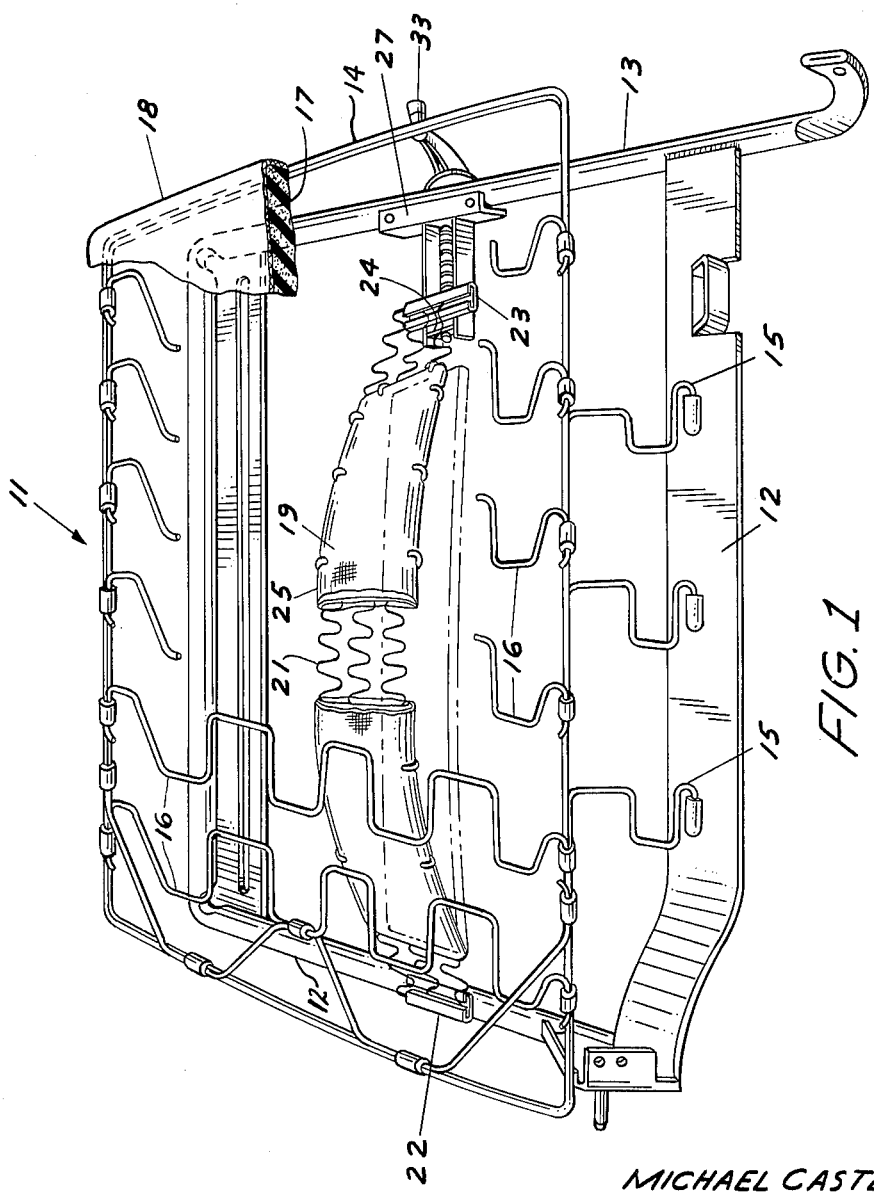
FIGURE 1 is a perspective view, in part sectional, of a seat back rest according to the present invention.

FIGURE 3 is a horizontal section through the back rest illustrating an adjustable spring means at one extreme position of adjustment resulting in a low spring rate for the seat back structure; and, FIGURE 4 is a horizontal section through the back rest illustrating the adjustable spring means at its other extreme position of adjustment with the spring rate of the back rest structure being at its maximum.

In FIGURE 1 is seen a back rest structure, generally designated as 11, which can be swingably attached to a horizontally extending seat frame (not shown) for a motor vehicle. The seat back structure 11 includes a generally rectangular main frame 12 with one side member 13 of the frame 12 extending downwardly to swingably connect to the seat frame.

An auxiliary upholstery frame 14 is resiliently maintained in a spaced relationship with the main frame 12 by conventional spring elements 15.

A plurality of spaced, sinuous spring elements 16 are disposed over the auxiliary frame 14. These sinuous spring elements 16 are illustrated as being vertically disposed and very slightly curved towards the back rest surface. The spring elements 16 are covered by a layer of upholstery material 17 such as foam rubber or other conventional padding material and a stretchable covering material 18. The covering material 18 extends beyond the sides of the auxiliary frame 14 with its ends attached to the main frame 12 as best seen in FIGURE 4.

The intermediate portions of some of the sinuous spring elements 16 have been omitted in FIGURE 1 of the drawings to more clearly depict a spring means 19 secured to the main frame 12. The spring means 19 extends in a direction transversely of the spaced sinuous spring elements 16 carried by the auxiliary frame 14. In this instance, the spring means 19 comprises three sinuous spring elements 21 extending transversely of the main frame 12 and being centrally disposed thereof. One end of each spring element 21 is securely held by a support member 22 directly attached to the main frame 12. The other end of each spring element 21 is secured to a channel-shaped element 23 carried by an adjustable slide 24 as hereinafter described. The spring means 19 may be covered by a fabric material 25 to prevent their interlocking with the intermediate portions of the longitudinally disposed spring elements 16 carried by the auxiliary frame 14.

As best seen in FIGURE 2, the slide 24 is slidably disposed in a channel 26 extending inwardly from an L-shaped bracket 27 welded to the side member 13 of the main frame 12. A spindle 28 having a threaded shank 29 is positioned within the channel 26 with one end thereof extending through the bracket 27 and the side member 13. The other end of the spindle 28 is rotatably secured by an end plate 31 mounted on the inwardly extending end of the channel 26.

The threaded shank 29 intermediate its ends extends through a threaded hole 32 in the slide 24. A handle 33 is attached to the end of the spindle 28 extending through the side member 13 to allow its rotation by a person sitting in the seat of the vehicle. Rotation of the handle 33 will result in the movement of the slide 24 towards or away from the support member 22 in the plane of the main frame 12.

When the slide 24 is moved so that the distance between the slide 24 and the support member 22 is at its maximum, the spring means 19, which has its respective ends supported by the slide 24 and the support member 22, will have its curved intermediate portion abutting the underside of the intermediate portions of the vertically extending spring elements 16 as best seen in FIGURE 3. This is a neutral position of engagement in that the spring means 19 exerts no outward displacement force on the intermediate portions of the spring elements 16.

When the handle 33 is rotated so as to move the slide 24 towards the support member 22, the spring means 19 will be increased in curvature. This will cause the intermediate portion of the spring means 19 to coact with the intermediate portions of the more centrally located spring elements 16 and, thus, displace them outwardly or away from the main frame 12.

As the spring elements 16 and the spring means 19 are displaced outwardly, the spring rate of the seat back structure 11 will be substantially increased to provide a definite back supporting effect which meets all individual requirements. It can be readily understood that movement of the slide 24 will result in variation of the curvature of the spring means 19. As the sliding movement can be readily controlled between a minimum and a maximum position, the spring rate can be adjustably set by the occupant of the seat by rotation of the handle 33 until the desired back support is achieved.

The occupant of the seat may rotate the handle 33 to any point to suit his personal anatomic requirements or he may desire to change the supporting back pressure during long rides to eliminate fatigue and backaches. The handle 33 being easily accessible permits the ready adjustment of the supporting back pressure during the operation of the vehicle.

It will be understood that the invention is not to be limited to the exact construction shown and described but that various changes and modifications may be made without departing from the spirit and scope of the invention as defined in the appended claims.

We claim:
1. A seat structure comprising a main frame and an auxiliary frame maintained in a spaced relationship to said main frame,
   a plurality of elongated spring elements in substantially parallel relationship to each other and having their end portions attached to said auxiliary frame,
   the intermediate portion of each elongated spring element being deflectable from the plane of said auxiliary frame upon having a load applied thereto,
   at least one additional spring means having a curved relationship to the plane of said main frame and extending in a substantially transverse relationship to the intermediate portions of said plurality of elongated spring elements, said spring means engaging one or more of said spring elements upon deflection of said intermediate portions of the elements under load,
   means supporting the end portions of said spring means for relative movement in the plane of said main frame,
   and means operative to relatively move said support means and thereby said spring means end portions toward or away from each other to vary the degree of curvature of said spring means,
   the degree of curvature of said spring means being determinative of the resistance to deflection under load of the intermediate portions of said elongated spring elements.

2. A seat structure comprising a main frame and an auxiliary frame maintained in a spaced relationship to said main frame,
   a plurality of elongated spring elements in substantially parallel relationship to each other and having their end portions attached to said auxiliary frame,
   the intermediate portion of each elongated spring element being displaceable from the plane of said auxiliary frame,
   at least one spring means being positioned in a substantially transverse relationship to the intermediate portion of said plurality of elongated spring elements,
   supporting members supporting each end portion of said spring means,
   at least one of said support members being movable relative to the other in the plane of said main frame,
   the portion of said spring means intermediate said support members being displaced from the plane of said main frame toward said spring elements,
   and means operative to relatively move said support members towards each other to increase the displacement of said portion of said spring means,
   the increased displacement causing said spring means to engage said spring elements and increase the spring rate of said seat structure when said spring means and elongated spring elements coact to support a load thereon.

3. A seat structure comprising a main frame and an auxiliary frame,
   said auxiliary frame being interconnected to said main frame in resilient spaced relationship thereto,
   said auxiliary frame being displaceable towards said main frame when said seat structure is occupied,
   a plurality of spaced, vertical spring elements having their end portions attached to said auxiliary frame,
   the intermediate portions of a plurality of said vertical spring elements having an initial displacement outwardly from the plane of said auxiliary frame,
   a spring means extending in a transverse relationship to said vertical spring elements and having its end portions attached to support members,
   said support members being movable relative to each other in the plane of said main frame,
   the portion of said transverse spring means intermediate said support members being displaced toward said spring elements,
   and means operative to relatively move said support members towards or away from each other to vary the displacement of the portion of said transverse spring means intermediate its end portions,
   the displacement of the portion of said transverse spring means intermediate its end portions being substantially the same as that of the intermediate portions of said longitudinal spring elements when said support members are a maximum distance from each other,
   the portion of said transverse spring means intermediate its end portions engaging the intermediate portions of the plurality of vertical spring elements to displace the latter from said initial displacement further outwardly from the plane of said auxiliary frame when the position of said support members relative to each other is less than the maximum distance therebetween, said spring means thereby coacting with said spring elements to increase the spring rate of the seat structure.

4. The seat structure according to claim 3 and which is further characterized in that said transverse spring means comprises a plurality of closely spaced parallel transversely extending spring elements encompassed by a covering to form a unitary transverse spring means.

5. A seat structure comprising a main frame and an auxiliary frame,
   spring means interconnecting said auxiliary frame to said main frane and maintaining said frames in a spaced relationship to each other, a plurality of spaced vertical spring elements having their end portions attached to opposite ends of said auxiliary frame, some of said spring elements being more centrally positioned of said main frame than others of said spring elements, a stretchable cushioned covering extending over said auxiliary frame and supported upon said vertical spring elements, the intermediate portions of said vertical spring elements being displaceable outwardly from the plane of said auxiliary frame, a pair of support members mounted on said main frame for movement in the plane thereof, at least one spring means extending in a transverse relationship to the intermediate portions of said vertical spring elements and having its end portions attached to said pair of support members, the intermediate portion of said transverse spring means being displaceable outwardly of the plane of said auxiliary frame, and means operative to relatively position said pair of support members with respect to each other to vary the displacement of the intermediate portion of said transverse spring means, the intermediate portion of said transverse spring means being in abutting relation to the intermediate portions of said vertical spring elements but exerting no outward displacement thereof when said pair of support members are at a maximum position from each other, said intermediate portion of the transverse spring means being displaced outwardly from the plane of said auxiliary frame to coact with the intermediate portions of said vertical spring elements to displace the latter and said covering outwardly from said auxiliary frame when the position of said pair of support members relative to each other is less than their maximum position, the relative displacement of the intermediate portions of the vertical spring elements varying the spring resistance of said seat structure to loads applied against said covering.

6. A seat structure according to claim 5 in which one of said pair of support members is attached to one end of said main frame and the other of said support members is movable in a track means extending inwardlly from the other end of said main frame at a point opposite said one of the pair of support members.

7. A seat structure according to claim 6 in which the means operative to relatively move said other of the pair of support members comprises a threaded spindle means within said track means threadingly engaged with the other of said support members, and rotating means to rotate said spindle means.

References Cited by the Examiner
UNITED STATES PATENTS

| | | | |
|---|---|---|---|
| 2,629,430 | 1/1953 | Flint | 267—85 |
| 2,710,648 | 6/1955 | Mouw | 267—87 |
| 3,052,459 | 9/1962 | Belsky | 267—89 |
| 3,095,188 | 6/1963 | Giese | 267—89 |

FRANK B. SHERRY, *Primary Examiner.*